D. T. FISHER.
ELECTRIC SWITCH.
APPLICATION FILED NOV. 10, 1909.

1,142,318.

Patented June 8, 1915.
2 SHEETS—SHEET 1.

Witnesses
Inventor
Dudley T. Fisher
By H. H. Bliss
Attorney

D. T. FISHER.
ELECTRIC SWITCH.
APPLICATION FILED NOV. 10, 1909.

1,142,318.

Patented June 8, 1915.
2 SHEETS—SHEET 2.

Witnesses
B. Gram
S. Jay Teller

Inventor
Dudley T. Fisher
By N. H. Bliss
Attorney

UNITED STATES PATENT OFFICE.

DUDLEY T. FISHER, OF COLUMBUS, OHIO, ASSIGNOR TO THE JEFFREY MANUFACTURING COMPANY, A CORPORATION OF OHIO.

ELECTRIC SWITCH.

1,142,318.

Specification of Letters Patent. Patented June 8, 1915.

Application filed November 10, 1909. Serial No. 527,299.

*To all whom it may concern:*

Be it known that I, DUDLEY T. FISHER, a citizen of the United States, residing at Columbus, in the county of Franklin and State of Ohio, have invented certain new and useful Improvements in Electric Switches, of which the following is a specification, reference being had therein to the accompanying drawing.

This invention relates to improvements in switches and connecting devices for electric conductors and is primarily intended for use in mines or other places where an atmosphere of explosive gases is frequently met with.

A switch embodying my improvements may be used either as an element in the permanent mine equipment or it may form a part of movable apparatus.

It is well known that mine explosions are frequently caused by electric sparks from various sources, and it is the object of this invention to provide a switch in which there will be no possibility of sparking.

Other objects of the invention are to provide various improvements in structure, which are set forth in the following specification.

In the accompanying drawings forming a part of this specification, I have shown one embodiment of my invention. I do not desire, however, to be limited to the exact construction which I have shown, and it will be understood that various changes may be made within the scope of my invention.

Figure 1:
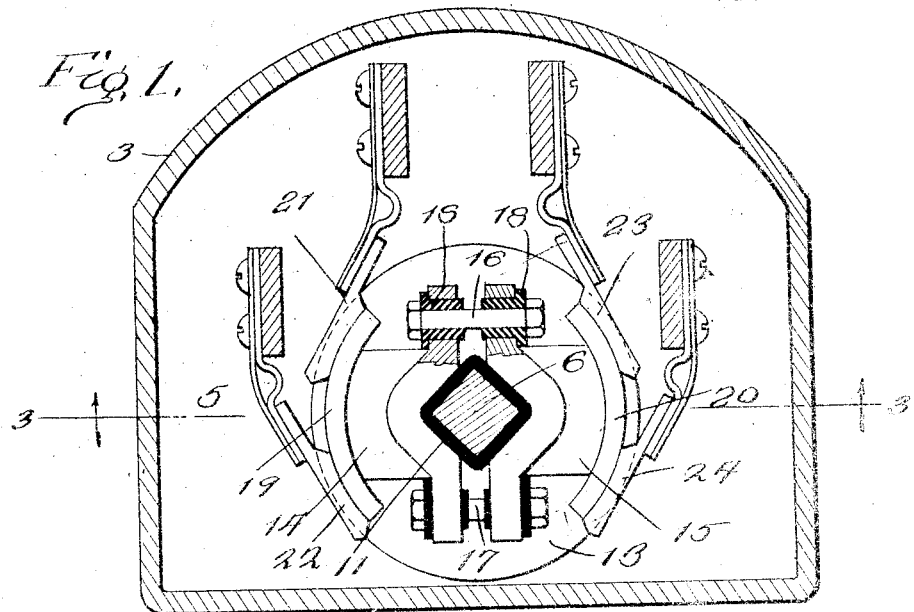
Figure 2:
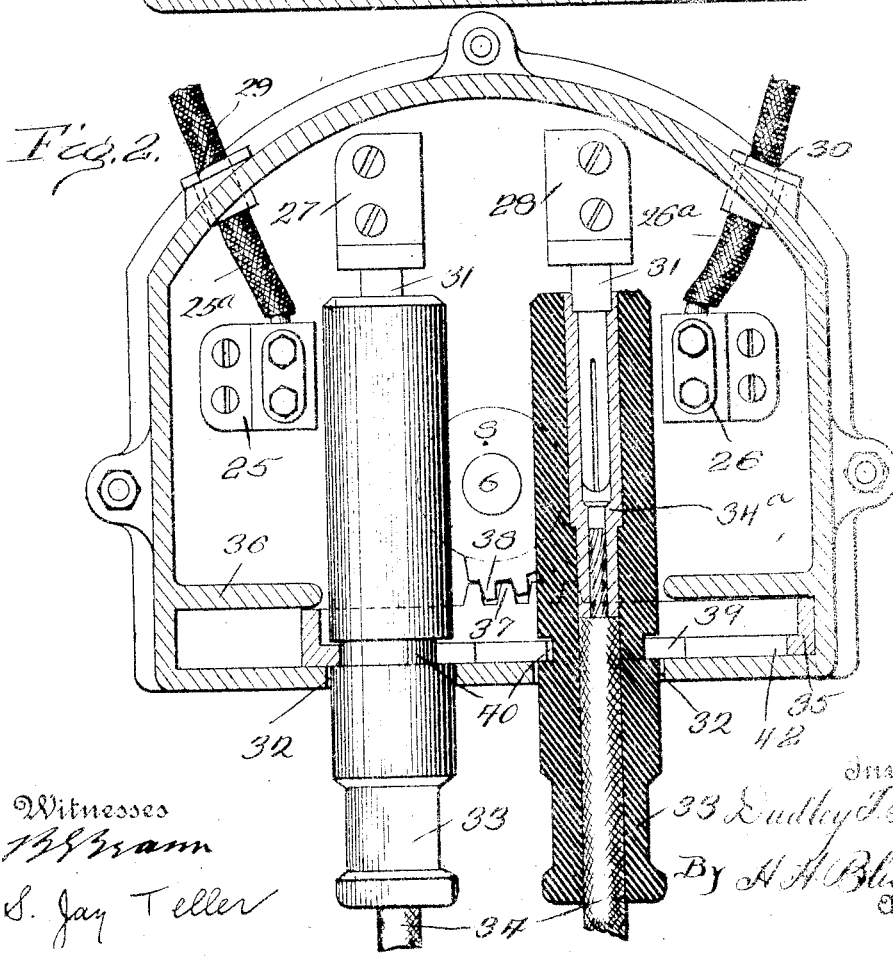
Figure 3:
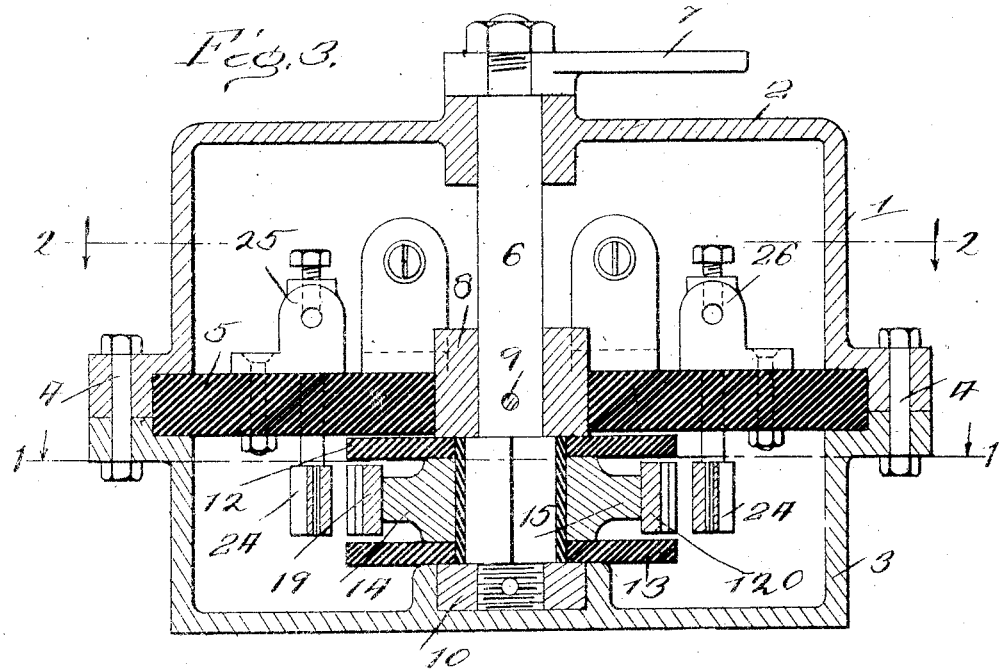
Figure 4:
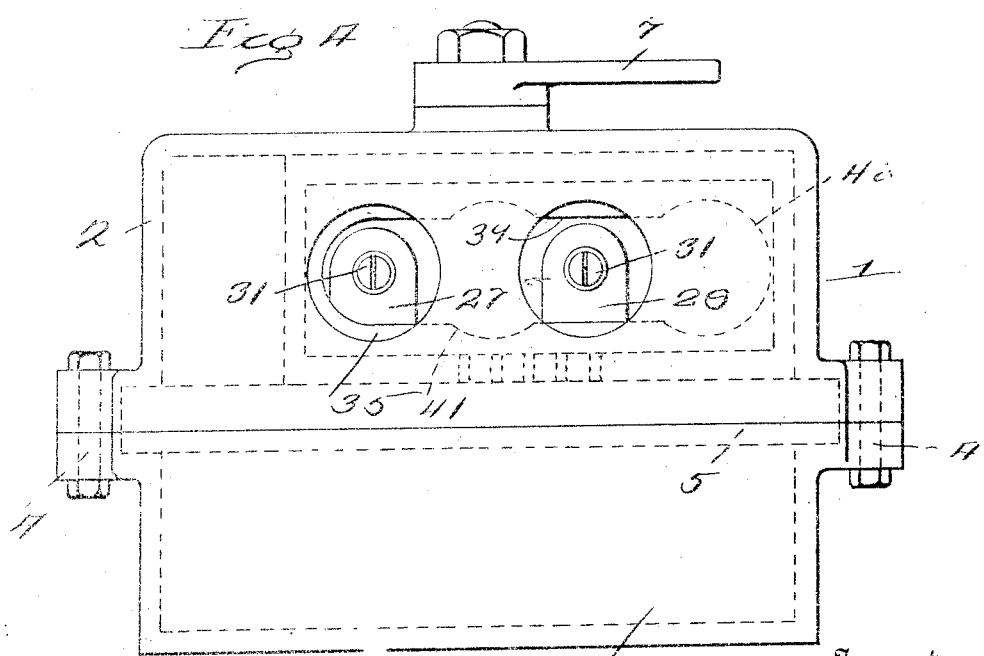

Of the drawing—Figure 1 is a cross sectional plan view taken along the line 1—1 of Fig. 3. Fig. 2 is a cross sectional plan view taken along the line 2—2 of Fig. 3. Fig. 3 is a cross sectional elevation taken along the line 3—3 of Fig. 1. Fig. 4 is an elevation.

Referring to the drawings, 1 represents the casing which comprises the upper section 2 and the lower section 3. The two sections are provided with suitable lugs, through which pass the connecting bolts 4—4.

5 is a plate or slab of suitable insulating material, such as slate. This slab is held in place between the two casing sections and serves as a support for the various parts to be hereinafter described. This slab serves as a cover for the lower half of the casing and forms in combination with it a gastight and flame-proof chamber.

6 is an operating shaft which extends through a suitable aperture in the top of the casing, and is provided with an operating handle 7.

8 is a hub secured to the shaft 6 by means of the pin 9. The hub is journaled in a suitable aperture in the plate 5. The lower end of the shaft is provided with the bearing ring 10, which is journaled in a bearing on the bottom of the casing. Between the hub 8 and the ring 10 the shaft 6 is preferably square and is surrounded by an insulating sleeve 11. At each end of this square section are provided two disks or washers 12, 13 of insulating material and having square central apertures adapted to engage the sleeve on the shaft. To the square part of the shaft 6 between the two insulating washers are clamped the two contact supports 14 and 15. These two supports are held in place by the two bolts 16 and 17, which pass through the flanged sleeves 18—18 mounted in suitable apertures in the supports. The contact segments 19 and 20 are fastened to the supports 14 and 15 by means of screws. By the construction which has been described, each of the two contact segments is completely insulated from the other.

21, 22, 23 and 24 are brushes, spring mounted on suitable brackets attached to the plate 5. They are so located that when the operating shaft is in the position shown in Fig. 1 electrical connection will be established by the contact segments between the brushes 21 and 22 and between the brushes 23 and 24. On the upper side of the plate or slab 5 are located the four terminal brackets 25, 26, 27 and 28. Of these brackets, 25 is connected through the slab 5 to the brush 22, while the bracket 26 is connected to the brush 24. 25ª and 26ª are conductor wires attached to the brackets 25 and 26. These enter the casing through the gas-tight seals 29 and 30. The brackets 27 and 28 are attached to the brushes 21 and 23 respectively. They are provided with horizontal parallel studs 31, 31, each of which is preferably split throughout a portion of its length. Opposite to these studs 31, 31, there are located in the casing two apertures 32, 32. 33, 33 are terminal plugs to which are attached the lead wires 34, 34. Each of these lead wires is connected to a tube 34ª, which is adapted to fit over and engage with one of the studs 31.

35 is a shutter mounted to slide along one side of the upper half of the casing. It is held in place and guided by the vertical flanges or walls 36, 36. Near its bottom this shutter is provided with a series of rack teeth 37, which engage with a segmental pinion 38, formed preferably as a part of the hub 8. By means of this rack and pinion, the shutter is moved when the shaft 6 is turned. The shutter 36 is provided with a longitudinal slot 39, of a less width than the diameter of the plugs 33, 33. Annular grooves 40 are formed in the plugs, and the edges of the slot in the shutter engage these grooves. At 41 and 42 the slot 39 is enlarged to a size slightly greater than the cross sectional area of the plugs.

The operation of the switch is as follows: When the various parts are in the position shown in the drawings, electrical connection is established on one side from the wire 26ª through the brush 24, the segment 20, the brush 23, and the bracket 28 to the plug 33. In a similar way, on the other side, connection is established from the conductor wire 25ª to the other plug 33. With the parts in this position, the shutter 35 is located at one end of its line of travel, and the narrow parts of the slot in the shutter engage the grooves in the plugs and prevent their withdrawal from the casing. When the switch is turned so that the connection is broken between the brushes, the enlarged parts of the slot 39 are brought into alinement with the plugs and they may be withdrawn from the casing at will. By means of this automatically locking feature it is made impossible for the plugs to be accidentally withdrawn when the current is passing through the wires. I prefer to fill the lower half of the casing with oil and thus prevent all sparks between the brushes and the contacts. Even, if this is not done, however, the lower half of the casing is flame-proof, and any sparks formed therein cannot be communicated to the outer atmosphere to cause an explosion. It will be noted that in addition to making the switch itself flame-proof, I have made it impossible for any sparks to be caused by the disconnecting of the terminal plugs.

What I claim is—

1. In an electric switch, the combination of a casing, a division slab in said casing forming a flame-proof chamber in one part thereof, an operating spindle extending through the slab, a contact making and breaking device connected to the spindle and located within the flame-proof chamber, terminals in the casing outside of the flame-proof chamber and connected to the contact device, conductor plugs adapted to engage the terminals through suitable apertures in the casing, a shutter adapted to engage the plugs when in one position and to disengage them when in another, a rack on the shutter, and a pinion on the spindle engaging the rack whereby the shutter is moved into its plug-engaging or its plug-disengaging position in accordance with whether the contact device is in its contact making or its contact breaking position, substantially as set forth.

2. In an electric switch, the combination of a casing, an operating shaft rotatable in the casing, one part of the said shaft being square, an insulating sleeve on the square part of the shaft, two contact segments each adapted to engage a corner of the bushing, clamping bolts between the two contacting segments, insulating sleeves surrounding the said bolts, and contact brushes adapted to engage the segments, substantially as set forth.

3. In an electric switch the combination of a casing provided with a wall dividing the casing into two chambers, one of which is flame proof, a spindle extending through the said dividing wall and adapted to oscillate about its axis, contact devices connected with the said spindle in the said flame proof chamber and adapted to make and break electrical connection, a conductor terminal in the other chamber, a conductor plug adapted to engage the said terminal, and means controlled by the movement of the said spindle and connected therewith outside of the said flame proof chamber for locking the said plug in engagement with the said terminal when electrical connection is established through the said contact devices, substantially as set forth.

In testimony whereof I affix my signature, in presence of two witnesses.

DUDLEY T. FISHER.

Witnesses:
E. L. HOPKINS,
G. B. NORRIS.